Patented Feb. 7, 1939

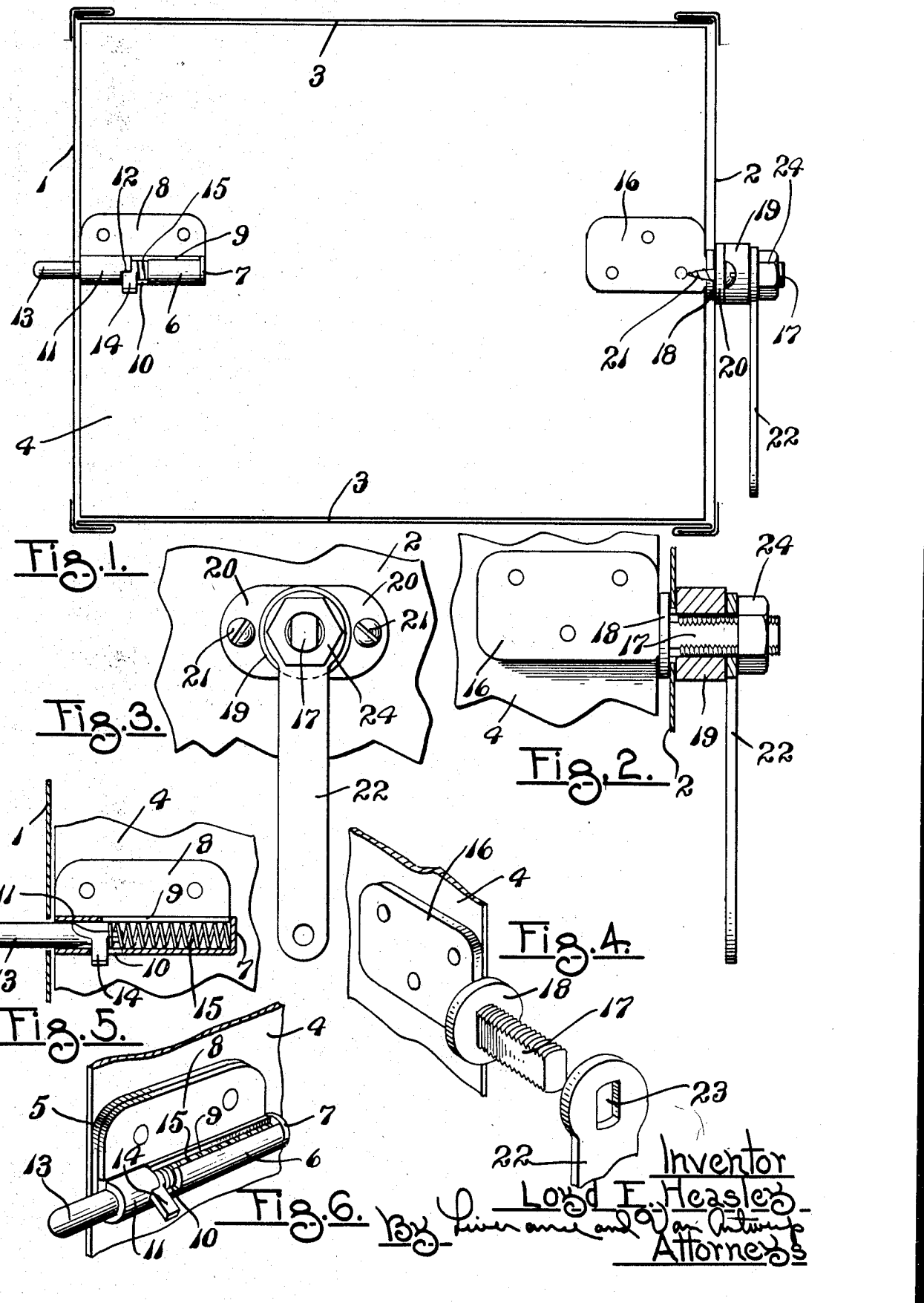

2,146,142

UNITED STATES PATENT OFFICE 2,146,142

DAMPER REGULATOR

Loyd E. Heasley, Holland, Mich., assignor to Hart & Cooley Manufacturing Company, Dover, Del., a corporation of Delaware Application October 5, 1936, Serial No. 104,083

5 Claims. (Cl. 126—285)

This invention relates to dampers and regulators therefor, and is primarily concerned with the production of a very economically manufactured, practical and efficient damper which may be easily mounted within a pipe or removed therefrom and adjustably held in any position to which it may be turned. The invention is directed to many novel details of construction for the effective attainment of simplicity and economy in manufacture, ease in assembly and efficiency in operation.

An understanding of the invention may be had from the following description, taken in connection with the accompanying drawing, in which, Fig. 1 is an elevation of the damper of my invention mounted within a furnace hot air pipe, the pipe being shown in transverse section.

Fig. 2 is a fragmentary vertical section through the pipe at one side thereof where the means for manually turning the damper is mounted.

Fig. 3 is an elevation of the damper mounting at the outer face of one side of the pipe.

Fig. 4 is a fragmentary perspective showing the mounting means for the same side of the damper as in Fig. 2, together with the upper end of the lever which is to manually turn the damper.

Fig. 5 is a fragmentary vertical section of the releasable mounting for the damper at the opposite side of the pipe, and Fig. 6 is a perspective view of said damper mounting shown in Fig. 5.

Like reference characters refer to like parts in the different figures of the drawing.

The pipe shown in Fig. 1 is shown as rectangular in cross section, having spaced parallel vertical sides 1 and 2 and spaced parallel top and bottom 3. While the pipe is shown as of rectangular cross section it is not essential that it be of such specific form but may take many other forms. The damper plate 4 is a plate of flat metal of a size to be readily received within the pipe and turned freely therein but substantially obstructing passage of air or the like through the pipe when the plate is disposed directly across the same. It is mounted for turning movement on the two opposed sides 1 and 2 of the pipe.

At one side of the plate 4 a sheet metal fixture, made from a plate of metal, is permanently secured, having an inner section 5 lying directly against a side of the damper plate 4 and which is curved at its lower part substantially into a cylinder 6 with an integral closure 7 at the inner end of the cylinder, the metal being continued in a plate 8 which overlies the inner plate 5. Rivets are passed through the plates 5 and 8 and the damper plate to permanently secure the fixture in place. The cylinder portion 6 is longitudinally slotted at its upper side at 9 from the closed end at 7 for part of its length, the slot at its outer end being enlarged downwardly as shown at 10. The metal which forms the cylinder 6 outwardly beyond the widened portion 10 is severed from the plate 8 so that it may be rolled into a continuation 11 of the cylinder 6 after the mounting pin for the damper plate has been put in place, thereby providing for the simple and ready assembly of the pin. The inner end of the rolled portion 11 has a short slot 12 extending from the lower portion of the enlarged slotted portion 10 for a purpose which will be later described.

A pivot pin 13 is mounted for slidable movement in the extension 11 of the cylinder 6 and adjacent its inner end is provided with an outwardly extending handle 14. A coiled spring 15, between the end 7 and the pin 13, normally holds the pin 13 in outer position as shown in Figs. 1, 5 and 6. In this position the handle 14 has been moved downwardly through the enlargement 10 at the outer end of the slot 9 and is partially received in the slot 12 thereby holding the pin against rotative movement. The pin is also locked against longitudinal movement sufficient to appreciably retract the same. It is evident that the handle 14 may be moved to compress the spring 15 until the enlarged slot 10 is reached, whereupon the handle may be turned upwardly and then be moved along the slot 9 so as to fully retract the pin. The pin 13 is designed to pass through an opening in the side 1 of the pipe and, when in the position shown in Figs. 1, 5 and 6, cannot be moved inwardly a sufficient distance to disengage from the pipe by pressure on the outer end of the pin. It is necessary to operate the handle member 14 from within the pipe to turn it upwardly to the position where such handle may traverse the slot 9 in order to fully retract the pin.

At the opposite side of the damper plate 4 a flat plate 16 of metal is provided and riveted or otherwise permanently secured to the damper plate. The plate 16 has an integral flat pivot member 17 extending therefrom beyond the adjacent edge of the damper plate, the flat sides of which are parallel with the flat surfaces of the damper 4, the upper and lower edges of the pivot 17 being threaded to receive a nut. The member 17 passes through an opening in the side 2 of the pipe and with the pin 13 provides a pivotal mounting for the damper plate which may be turned about a horizontal axis extending through the pivots 13 and 17. A disk 18 is passed over the pivot member 17 and may be welded or otherwise permanently secured to said pivot member at the outer edge of the plate 16 and against the adjacent edge of the damper plate 4.

A bearing boss 19 is provided with oppositely extending ears 20 through which screws 21 are passed and also through the side 2 of the pipe for securing it in place, the side of the pipe and the boss having alined openings for passage of the pivot 17. An operating handle 22 at its upper end preferably has a flat sided opening 23 to receive the pivot member 17 with the sides of the opening 23 engaging against the opposite parallel flat sides of the pivot member 17. The handle 22 preferably extends parallel with the flat sides of its opening 23 and therefore is necessarily parallel with the plane of the damper 4. A nut 24 is screwed onto the threads of the pivot 17 for the purpose of retaining the operating handle in place and for clamping the damper in its desired adjustment.

With the construction described the damper plate 4 is readily inserted in the pipe, the pivot member 17 passing through the opening in the side 2, and the disk 18 bearing against the inner side of the side 2 of the pipe. When this is done, the pin 13 having been retracted, is released so that when its outer end comes opposite the opening to receive it in the side 1 of the pipe it automatically moves outward under the force of spring 15. The handle 14 is then turned to a position to seat in the slot 12 whereupon the pin 13 is held against any retraction which might come from pressure at its outer end. The boss 19 is secured in place and the handle applied over the pivot member 17, the nut 24 screwed onto the pivot 17, whereupon the installation is complete. Tightening the nut 24 binds the handle 22 against the boss 19 and firmly holds the damper in a position to which adjusted until the nut is released for a subsequent adjustment.

The disk or washer 18 is not essential and may be omitted with substantially the same results in operation. It is not necessary to fasten the bearing boss 19 to the side 2 of the pipe and therefore its ears 20 may be omitted. This boss 19 may be in the nature of a gasket and when clamped against the pipe by the nut 24 the parts will be held firmly in adjusted position by friction only.

The handle 22 may be interposed between the boss 19 and the nut 24 as illustrated and described or the nut 24 may directly engage the boss 19 and the handle may be placed temporarily on the outer end of the pivot 17 for adjusting the damper to desired position and after the nut 24 is tightened to clamp it in place the handle may be removed. In either event it will be noted that the handle can only be placed upon the pivot 17 in one of two positions in either of which it extends parallel with the damper. Thus even though the damper is concealed within the pipe it is possible to determine definitely its position, this being indicated by the handle.

The construction is economical to produce, is durable and efficient in operation and has proved very satisfactory in service. The invention is defined in the appended claims and is to be considered comprehensive of all forms of structure coming within their scope.

I claim:

1. In a damper, a damper plate of flat metal, a flat metal member secured to one side of said damper plate adjacent an edge of the plate and having an integral pivot member extending therefrom beyond the edge of the plate, said member being threaded at its opposite narrower sides, a handle having a rectangular opening to pass over said member and a nut threaded onto the end of the member, for the purposes specified.

2. In combination, a pipe, a damper within said pipe, a pivot fixed to the damper and extending through a wall of said pipe, the outer end of said pivot having a cross-sectional shape other than round, a handle shaped to indicate direction and having an opening corresponding to the shape of said pivot, threads on said pivot adapted to receive a nut for tightening said handle, said shape of said pivot and said opening being so located that said handle can only be placed upon said pivot in position that the direction indicated by said handle is parallel with the plane of said damper.

3. In combination, a pipe, a damper within said pipe, a pivot fixed to said damper and extending through a wall of said pipe, the outer end of said pivot having an elongated cross-section extending parallel with the plane of said damper, a handle shaped to indicate direction and having an elongated opening to receive the outer end of said pivot, said pivot being threaded to receive a nut thereon to maintain said damper and handle in any specified position and said elongated opening extending parallel with the direction indicated by said handle.

4. In a construction of the class described having a pipe which is rectangular in cross section with diametrically opposed openings therein, the combination of, a damper formed of a plate having substantially the same dimensions as the cross sectional dimensions of the said pipe, a pivot, yieldable and adjustable means for fastening the pivot onto the damper plate adjacent one of said opposed openings whereby the pivot is movable to a position within the confines of said rectangular damper plate, a second pivot mounted on the damper plate adjacent the other opening through the said pipe, the cross section of the second pivot being of rectangular shape, the longer axis of which is substantially parallel to the plane of the said damper, the opening through the pipe through which the second pivot passes being substantially circular and having a diameter only slightly more than the longer dimension of the cross section of the said second pivot.

5. In combination with a pipe having oppositely disposed openings therein, of a damper member having a flat metal member secured to one side of the damper plate and having an integral pivot member extending therefrom through one of said openings, the cross sectional shape of the pivot member being of rectangular shape, the opening in the pipe through which it passes being circular, the diameter of said opening being slightly greater than the longer dimension of the pivot member's cross section and retractable pivot means fastened to the damper plate and cooperatively associated with the opposed opening in the said pipe.

LOYD E. HEASLEY.